United States
Johnson

[11] 3,912,377
[45] Oct. 14, 1975

[54] ADJUSTABLE PHOTOGRAPHIC OBJECTIVE
[75] Inventor: Walter J. Johnson, Mundelein, Ill.
[73] Assignee: Bell & Howell Company, Chicago, Ill.
[22] Filed: Oct. 21, 1974
[21] Appl. No.: 516,691

[52] U.S. Cl.................................. 350/215; 350/252
[51] Int. Cl.²............................................. G02B 9/62
[58] Field of Search..................................... 350/215

[56] References Cited
UNITED STATES PATENTS
2,923,203  2/1960  Tronnier............................. 350/215
2,955,513  10/1960  Tronnier............................. 350/215

Primary Examiner—John K. Corbin
Attorney, Agent, or Firm—John E. Peele, Jr.

[57] ABSTRACT

The photographic objective comprises a plurality of individual lens elements, one of which is adjustable through a small axial amount for fine adjustment of the focal length of the lens system. The focal length adjustment permits matching mass produced lens systems in pairs so that the focal length of every pair of such lenses can be adjusted within very close tolerances.

1 Claim, 1 Drawing Figure

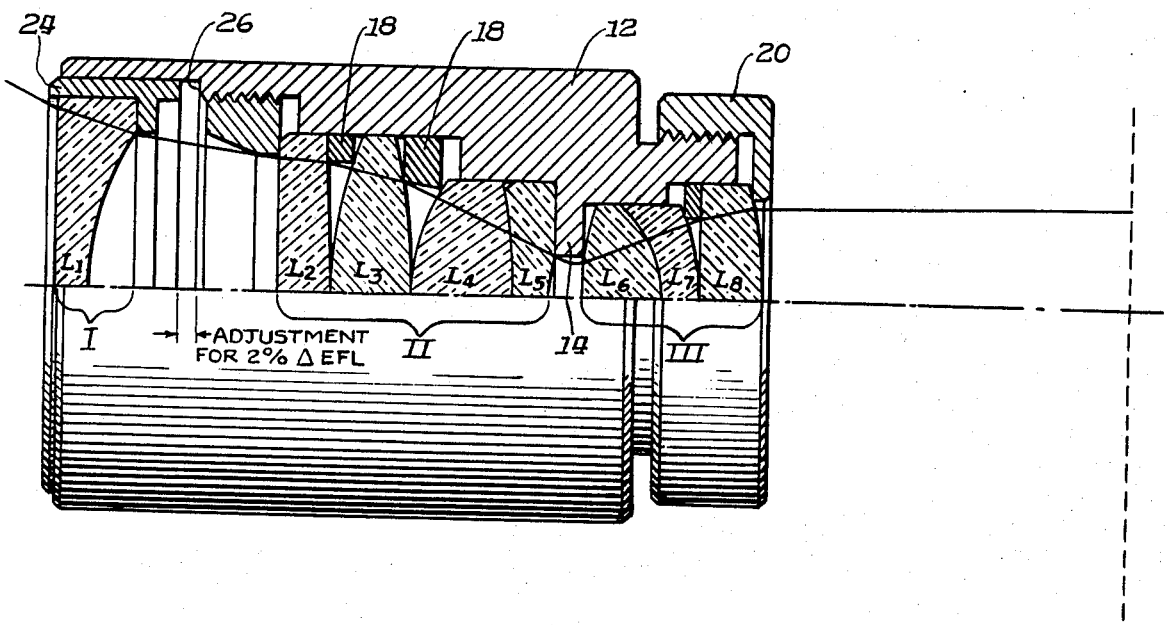

ADJUSTABLE PHOTOGRAPHIC OBJECTIVE

Objective lenses have been used in recording devices for reducing images to be formed on a film or magnifying images to be displayed from the film or other light sensitive materials. Since the lenses are for high magnification or high reduction applications, the optical corrections and performance characteristics were necessarily maintained at extremely high levels. In machines in which two critically matched images are to be formed, critically matched lens systems are necessary. Such lens systems were alternatively manufactured in large lots and matching pairs manually selected; or were manufactured to such extremely critical tolerances as to qualify the lenses are being "hand made." In either example, the cost of critically matched pairs of lenses was increased because of the significant amounts of manual labor required.

To reduce the cost of manufacturing pairs of lenses matched critically as to focal length, a lens system is designed with one of its several elements adjustable within a small range for "fine tuning" of the focal length. The system has been designed with optical correction and performance characteristics at least comparable to the corrections and characteristics of existing lens systems throughout the range of focal length tolerance required. Because each objective lens system can be quickly matched to a predetermined focal length regardless of the build-up of acceptable tolerances during grinding and polishing steps of manufacture of individual elements, mass production methods can be maintained with their attendant cost reductions. Hence, the resulting pairs of lenses can be randomly selected and the focal lengths matched for each machine.

An object of the invention is to provide mass produced photographic objectives of high performance which can be matched critically as to focal length by fine adjustment of at least one component of the lens system to compensate for tolerance variations during manufacture.

The above and other objects and advantages of the invention will become apparent from the detailed description which follows when considered in conjunction with the accompanying drawings.

IN THE DRAWINGS:

FIG. 1 is a diagrammatical sectional view of a photographic objective according to the invention.

Referring to the drawings, an optical system for a photographic objective lens having a nominal, fixed focal length is shown. The lens design includes three components I through III comprising 8 elements $L_1$ through $L_8$. A lens barrel 12 provides for precise positioning and spacing of the elements as well as defining a limiting aperture and element positioning shoulder 14 to limit the peripheral rays which may pass through the lens system. Spacers 18 and retainer 20 cooperate with the barrel to maintain the positions of the elements and provide still other peripheral ray limiting apertures. In this preferred embodiment of an 18mm. lens with an effective aperture of f/5.6, the optical performance specification limits the format to a 12.7mm diagonal.

Referring to the elements as seen from left to right in FIG. 1, element $L_1$ is a negative lens mounted in an adjustable sleeve 24 which is axially shiftable by ±0.43mm (±.017 inch) resulting in altering the effective focal length of the lens system by approximately 2 percent. When the focal adjustment is made during assembly, the sleeve 24 is cemented or otherwise fixed to the barrel 12.

Component II is air spaced from component I by an abutment 26 which determines the minimum proximity to which component I can be adjusted. The four elements $L_2$, $L_3$, $L_4$, and $L_5$ comprising component II are essentially in axial contact along the optical axis although the peripheral portions thereof are air spaced, except between elements $L_4$ and $L_5$. This cemented positive component effectively converges the rays toward component III.

Component III comprises three elements $L_6$, $L_7$ and $L_8$ which are air spaced from component II in a fixed axial position. Elements $L_6$ and $L_7$ are in full contact one with another, while element $L_8$ is separated slightly from element $L_7$. The elements of this component are retained in a position by the threaded retainer ring 20.

In summary, all but one of the elements of the lens design are assembled without requiring exceptional care insofar as spacing is concerned. That is, component II is assembled from one side of the positioning stop 14 in the barrel 12; and component III is assembled in the barrel from the other side of the positioning stop. Only element $L_1$ of component I requires specific adjustment to finely adjust the focal length of the lens system.

The optical values of the optical system of FIG. 1 are as follows:

TABLE 1

EFL = 18mm
½ Angle of Field = 23° 46'

| LENS | RADII | THICKNESS | V | N |
|---|---|---|---|---|
| $L_1$ | $R_1$ = 6.0510<br>$R_2$ = −.4620 | $D_1$ = .053 | 64.2 | 1.517 |
| $L_2$ | $R_3$ = 41.3805<br>$R_4$ = 3.6500 | $D_2$ = .088 | 55.1 | 1.618 |
| $L_3$ | $R_5$ = .7070<br>$R_6$ = 1.2610 | $D_3$ = .127 | 43.9 | 1.606 |
| $L_4$ | $R_7$ = .3880<br>$R_8$ = 1.1210 | $D_4$ = .164 | 50.4 | 1.720 |
| $L_5$ | $R_9$ = 1.1210<br>$R_{10}$ = −.2510 | $D_5$ = .062 | 27.6 | 1.755 |
| $L_6$ | $R_{11}$ = −.5000<br>$R_{12}$ = +.1898 | $D_6$ = .134 | 70.4 | 1.487 |
| $L_7$ | $R_{13}$ = −.1898<br>$R_{14}$ = .3600 | $D_7$ = .061 | 50.4 | 1.720 |
| $L_8$ | $R_{15}$ = −6.1440<br>$R_{16}$ = .6700 | $D_8$ = .098 | 63.5 | 1.552 |

In the above table, the first column lists the lens elements numerically starting at the ray entrance side of the system. The second column lists the respective radii of surfaces of the elements. The third column lists the thickness of the respective elements. The fourth and fifth columns list respectively the dispersion index V and the refractive index N. "EFL" is the effective focal length of the lens, and "½ Angle of Field" is one-half the angle between the continuation of the lens axis and a line from the nodal point of the lens to the most oblique point recorded on the film.

What is claimed is:

1. An optical system including a plurality of fixed elements and at least one adjustable component, the system having substantially the following specification:

EFL = 18mm
½ Angle of Field = 23° 46'

| LENS | RADII | THICKNESS | V | N |
|---|---|---|---|---|
| $L_1$ | $R_1 = 6.0510$ | $D_1 = .053$ | 64.2 | 1.517 |
|  | $R_2 = -.4620$ |  |  |  |
| $L_2$ | $R_3 = 41.3805$ | $D_2 = .088$ | 55.1 | 1.618 |
|  | $R_4 = 3.6500$ |  |  |  |
| $L_3$ | $R_5 = .7070$ | $D_3 = .127$ | 43.9 | 1.606 |
|  | $R_6 = 1.2610$ |  |  |  |
| $L_4$ | $R_7 = .3880$ | $D_4 = .164$ | 50.4 | 1.720 |
|  | $R_8 = 1.1210$ |  |  |  |
| $L_5$ | $R_9 = 1.1210$ | $D_5 = .062$ | 27.6 | 1.755 |
|  | $R_{10} = -.2510$ |  |  |  |
| $L_6$ | $R_{11} = -.5000$ | $D_6 = .134$ | 70.4 | 1.487 |
|  | $R_{12} = +.1898$ |  |  |  |
| $L_7$ | $R_{13} = .1898$ | $D_7 = .061$ | 50.4 | 1.720 |
|  | $R_{14} = .3600$ |  |  |  |
| $L_8$ | $R_{15} = -6.1440$ | $D_8 = .098$ | 63.5 | 1.552 |
|  | $R_{16} = .6700$ |  |  |  | wherein the first column lists the lens elements numerically starting at the ray entrance side of the system; the second column lists the respective radii $R_1$ to $R_{16}$ of the surfaces of the elements; the third column lists the thickness $D_1$ to $D_8$; and the fourth and fifth column lists respectively the dispersion index V and the refractive index N of the elements of the optical system.

* * * * *